United States Patent
Hung

(10) Patent No.: US 10,107,448 B1
(45) Date of Patent: Oct. 23, 2018

(54) ADJUSTMENT MECHANISM AND LIFTING DEVICE HAVING THE ADJUSTMENT MECHANISM

(71) Applicant: Modernsolid Industrial Co., Ltd., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 0 days.

(21) Appl. No.: 15/942,645

(22) Filed: Apr. 2, 2018

(30) Foreign Application Priority Data

Jul. 6, 2017 (TW) .............................. 106209935 U

(51) Int. Cl.
  *F16M 11/26* (2006.01)
  *A47C 3/40* (2006.01)
  *A47B 9/20* (2006.01)

(52) U.S. Cl.
  CPC ................ *F16M 11/26* (2013.01); *A47B 9/20* (2013.01); *A47B 2200/0052* (2013.01); *A47C 3/40* (2013.01)

(58) Field of Classification Search
  CPC .. F16M 11/26; A47C 3/40; A47B 9/20; A47B 2200/0052

USPC ....................................................... 248/188.5
See application file for complete search history.

(56) References Cited

U.S. PATENT DOCUMENTS

| 9,743,755 | B2 * | 8/2017 | Lin ........................... B66F 3/26 |
| 2011/0225903 | A1 * | 9/2011 | Lounis .................... B66F 11/00 52/122.1 |
| 2015/0285430 | A1 * | 10/2015 | Wang ....................... A47B 9/04 248/188.5 |
| 2016/0281912 | A1 * | 9/2016 | Christen ................ F16M 11/26 |
| 2017/0051869 | A1 * | 2/2017 | Hsiao ..................... F16M 11/26 |
| 2018/0140087 | A1 * | 5/2018 | Wu .......................... A47B 9/20 |

* cited by examiner

*Primary Examiner* — Todd M Epps
(74) *Attorney, Agent, or Firm* — Husch Blackwell LLP

(57) ABSTRACT

An adjustment mechanism is configured to be disposed between inner and outer tubes of a lifting device, and includes two angularly space-apart abutment modules configured to be disposed on an inner wall surface of the outer tube and each of which has an abutment unit configured to abut against an outer wall surface of the inner tube, and an adjustment module including an adjustment seat, and a pressing unit and a drive member both disposed on the adjustment seat. The drive member is operable to drive movement of the adjustment seat relative to the outer tube so as to push the pressing unit against the outer wall surface of the inner tube to thereby abut the outer wall surface of the inner tube against the abutment units of the abutment modules.

14 Claims, 18 Drawing Sheets

ADJUSTMENT MECHANISM AND LIFTING DEVICE HAVING THE ADJUSTMENT MECHANISM

CROSS-REFERENCE TO RELATED APPLICATION

This application claims priority of Taiwanese Patent Application No. 106209935, filed on Jul. 6, 2017.

FIELD

The disclosure relates to an adjustment mechanism, more particularly to an adjustment mechanism of a lifting device.

BACKGROUND

Referring to FIGS. 1 and 2, a conventional lifting device 1 includes an outer tube 11, an inner tube 12 movably inserted into the outer tube 11, and a support module 13 disposed between the outer and inner tubes 11, 12. The support module 13 includes three spaced-apart columns of ball units 14, each column of which has a plurality of balls 141. The balls 141 are sandwiched between the outer and inner tubes 11, 12. When the inner tube 12 is moved relative to the outer tube 11 along an axial direction, the balls 141 will rotate to permit smooth movement of the inner tube 12 relative to the outer tube 11.

Since the sizes of the balls 141 depend on a gap between the outer and inner tubes 11, 12, when there is a slight change in the diameter of the inner tube due to production error, the gap between the outer and inner tubes 11, 12 will change. As a result, the movement of the inner tube 12 relative to the outer tube 11 is unstable. If the gap between the outer and inner tubes 11, 12 is excessively large, each ball 141 will have to be replaced with a larger diameter. Hence, the support module 13 of the conventional lifting device 1 cannot provide a stable support due to the changes in the gap between the outer and inner tubes 11, 12.

SUMMARY

Therefore, an object of the present disclosure is to provide an adjustment mechanism of a lifting device that is capable of overcoming the aforesaid drawback of the prior art.

According to one aspect of this disclosure, an adjustment mechanism of a lifting device, which includes an outer tube and an inner tube movably inserted into the outer tube, is configured to be disposed between the inner and outer tubes and comprises two angularly space-apart abutment modules configured to be disposed on an inner wall surface of the outer tube, and an adjustment module configured to be disposed on the inner wall surface of the outer tube angularly spaced apart from the abutment modules. Each abutment module includes an abutment unit configured to abut against an outer wall surface of the inner tube. The adjustment module includes an adjustment seat, and a pressing unit and a drive member both disposed on the adjustment seat. The drive member is operable to drive movement of the adjustment seat relative to the outer tube so as to push the pressing unit against the outer wall surface of the inner tube to thereby abut the outer wall surface of the inner tube against the abutment units of the abutment modules.

Another object of this disclosure is to provide a lifting device that has an adjustment mechanism capable of overcoming the aforesaid drawback of the prior art.

According to another aspect of this disclosure, a lifting device comprises an outer tube, an inner tube movably inserted into the outer tube, and an adjustment mechanism disposed between the inner and outer tubes. The adjustment mechanism includes two angularly space-apart abutment modules disposed on an inner wall surface of the outer tube, and an adjustment module disposed on the inner wall surface of the outer tube angularly spaced apart from the abutment modules. Each abutment module includes an abutment unit abuttable against an outer wall surface of the inner tube. The adjustment module includes an adjustment seat, and a pressing unit and a drive member both disposed on the adjustment seat. The drive member is operable to drive movement of the adjustment seat relative to the outer tube so as to push the pressing unit against the outer wall surface of the inner tube to thereby abut the outer wall surface of the inner tube against the abutment units of the abutment modules.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
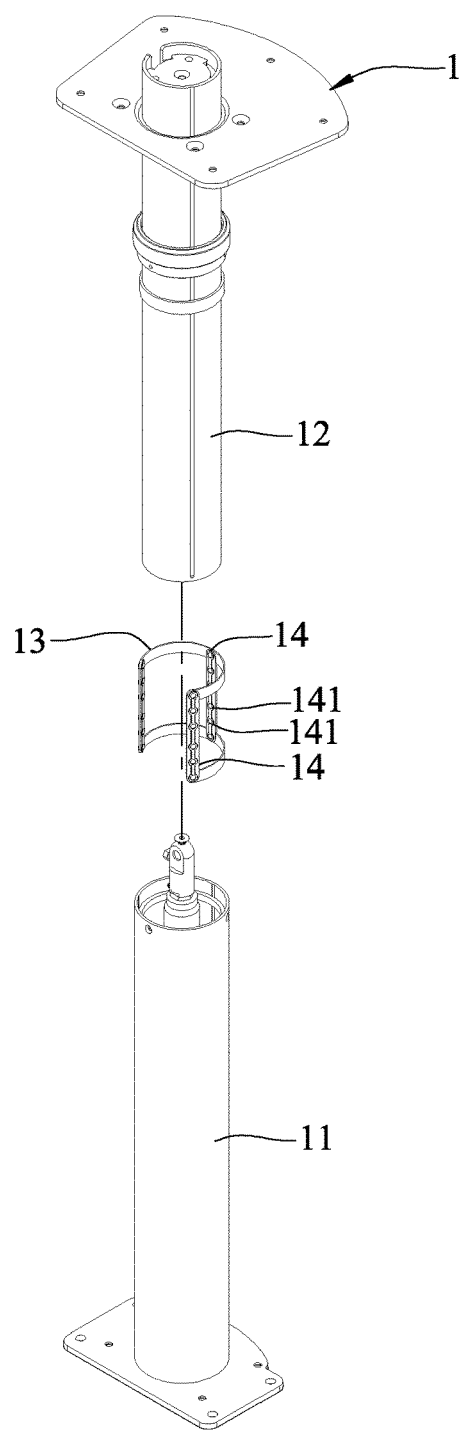
FIG. 1 is an exploded perspective view of a conventional lifting device.
Figure 2:
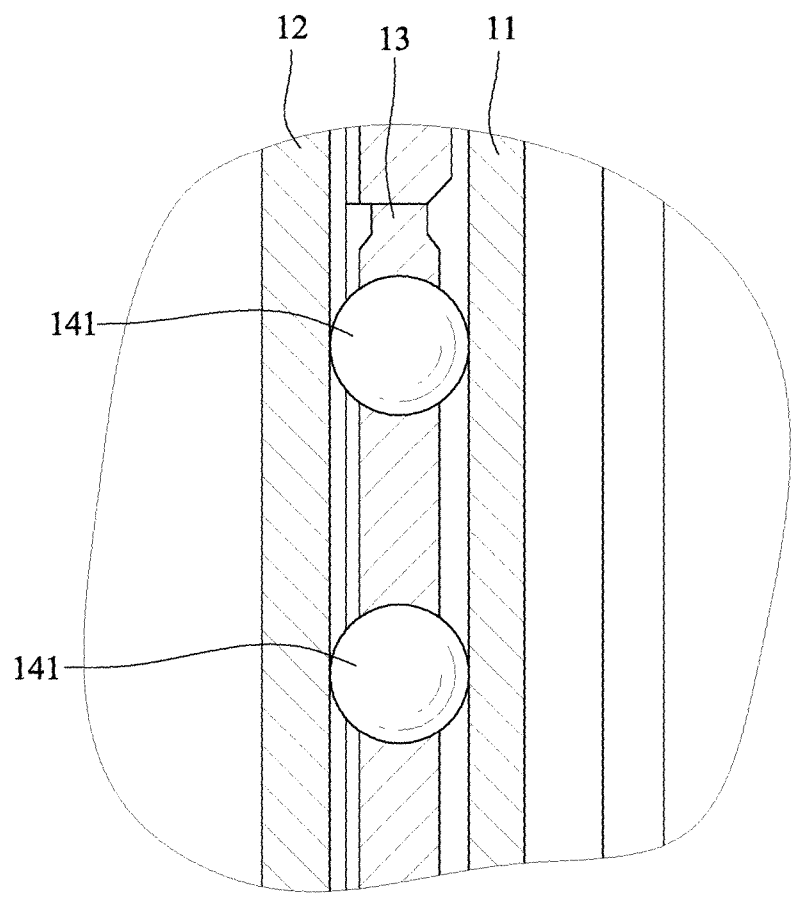
FIG. 2 is an enlarged fragmentary sectional view of the conventional lifting device, illustrating a plurality of balls of a support module sandwiched between inner and outer tubes thereof.

Before the present disclosure is described in greater detail with reference to the accompanying embodiments, it should be noted herein that like elements are denoted by the same reference numerals throughout the disclosure.

Figure 3:
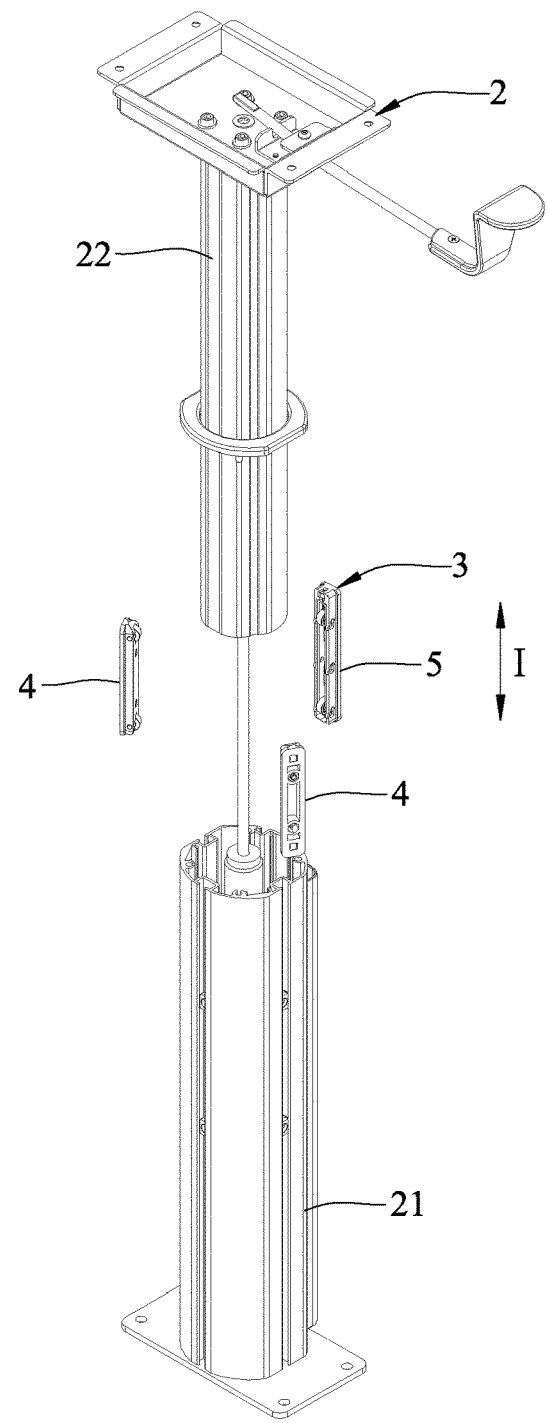
FIG. 3 is an exploded perspective view of a lifting device according to the first embodiment of the present disclosure.
Figure 4:
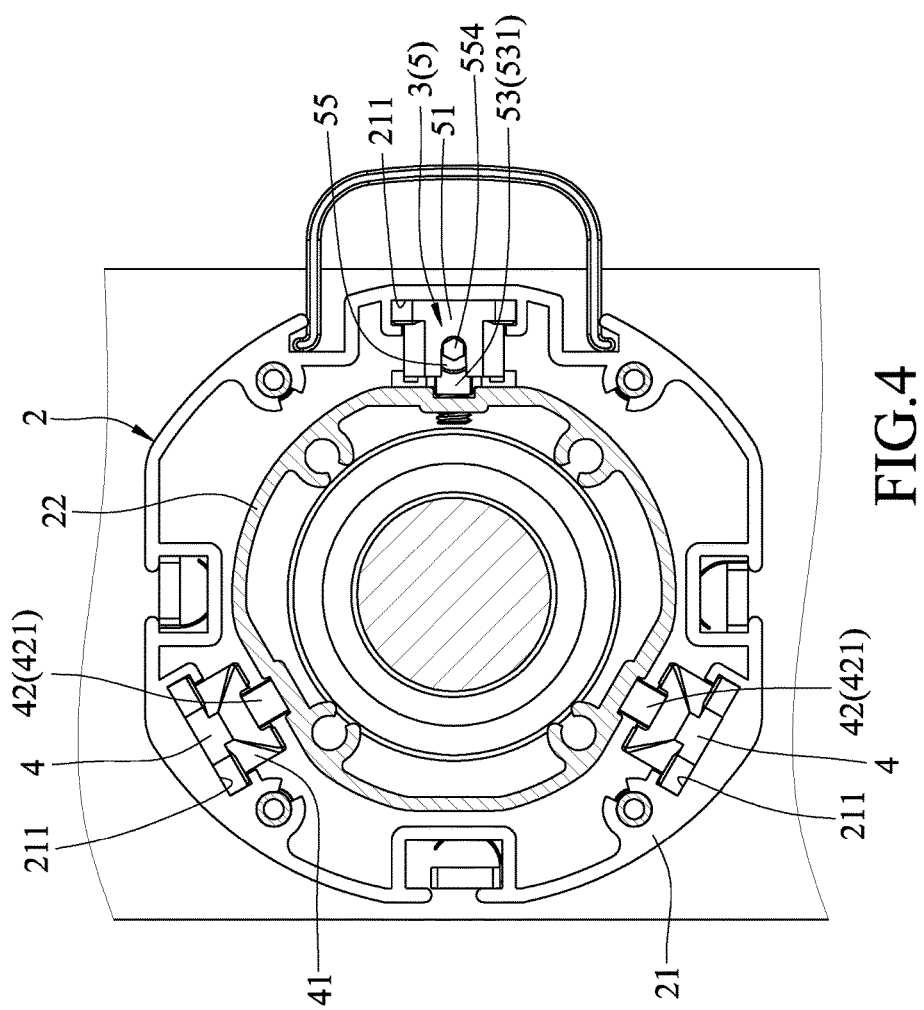
FIG. 4 is an enlarged fragmentary sectional view of the first embodiment, illustrating two abutment modules and an adjustment module disposed on an outer tube and cooperatively clamping an inner tube.

Referring to FIGS. 3 and 4, a lifting device 2 according to the first embodiment of the present disclosure is shown to include an outer tube 21, an inner tube 22, and an adjustment mechanism 3.

The outer tube 21 extends along a longitudinal direction (I), and has three angularly spaced-apart mounting holes 211 formed in an inner wall surface thereof and extending along the longitudinal direction (I). Each mounting hole 211 has an opening.

The inner tube 22 also extends along the longitudinal direction (I), and is movably inserted into the outer tube 21. The opening of each mounting hole 211 faces the inner tube 22.

The lifting device 2 may be applied to a lift chair (not shown) for lifting a seat, a lift table (not shown) for lifting a table board, a lift platform (not shown) for lifting a platform seat, or the like, and is not limited to what is disclosed herein.

The adjustment mechanism 3 includes two abutment modules 4 and an adjustment module 5 that cooperatively surround the inner tube 22 and that are respectively mounted in the mounting holes 211 of the outer tube 21.

Figure 5:
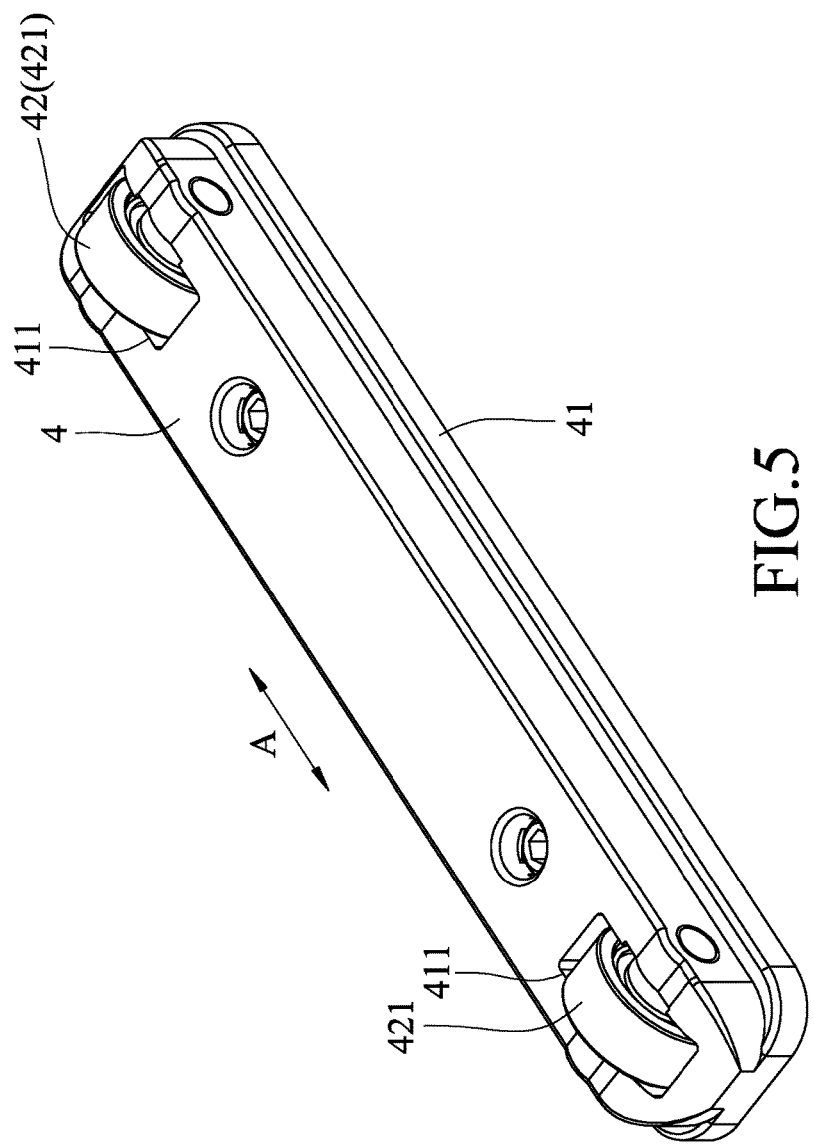
FIG. 5 is a perspective view of the abutment module of the first embodiment.
Figure 11:
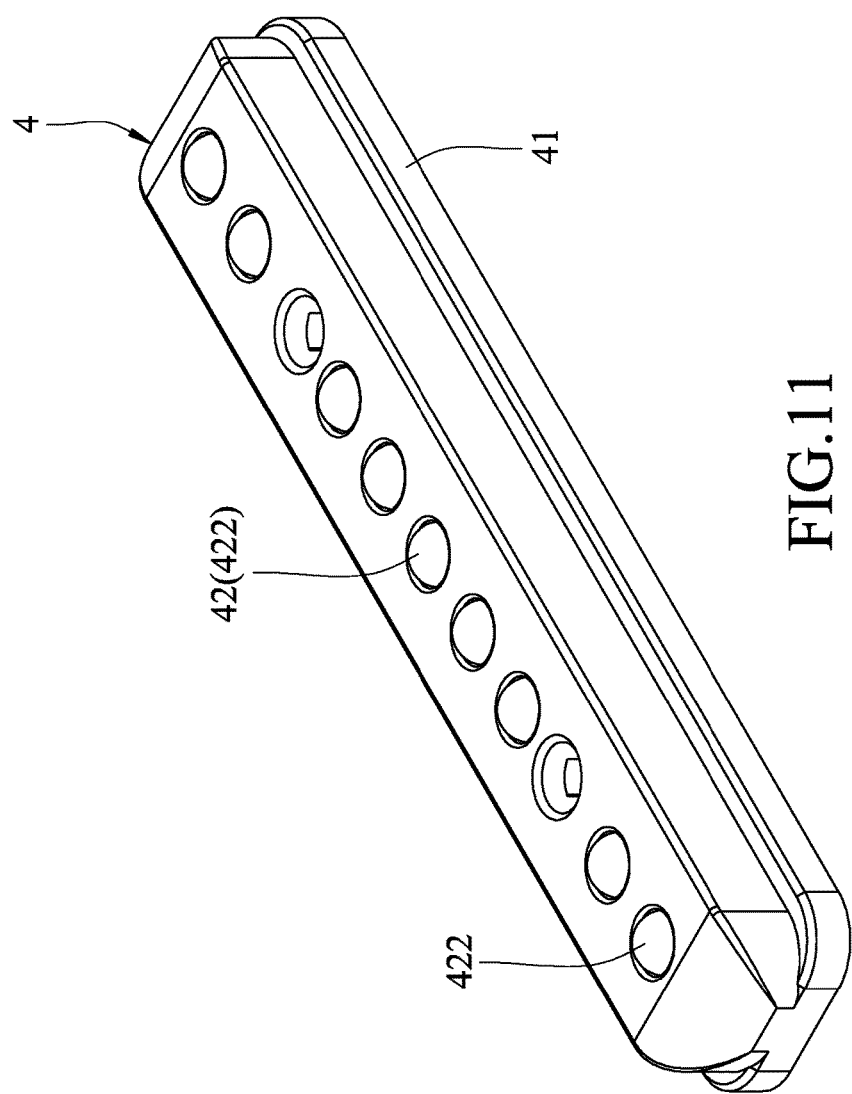
FIG. 11 is an alternative form of the abutment module of the first embodiment, in which the abutment module includes a plurality of balls.
Figure 12:
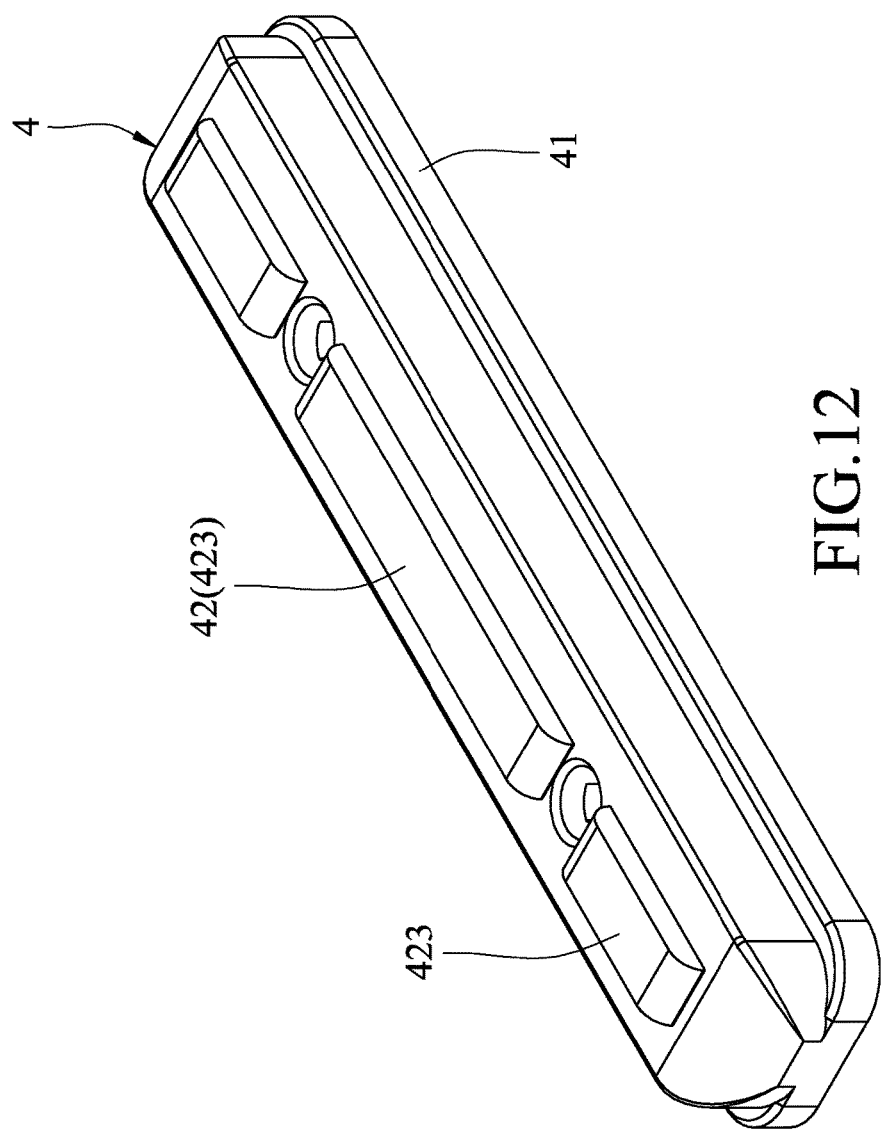
FIG. 12 is another alternative form of the abutment module of the first embodiment, in which the abutment module includes a plurality of slide plates.
Figure 13:
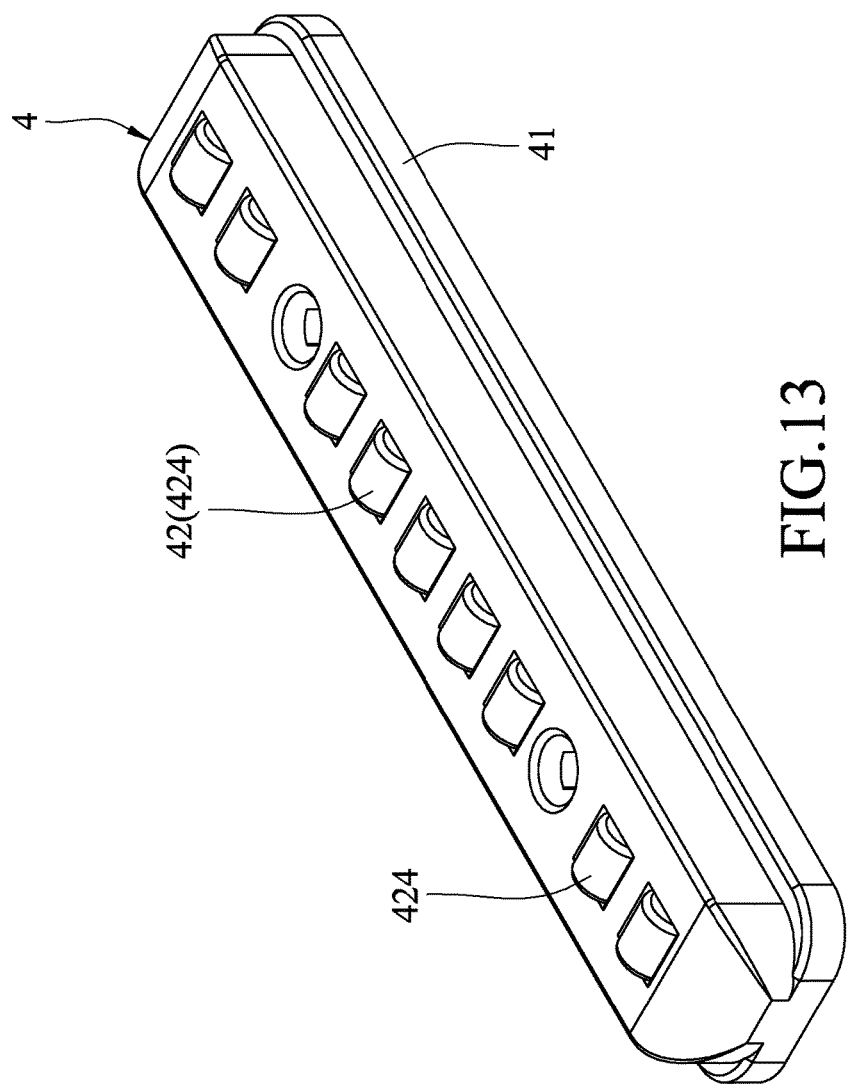
FIG. 13 is yet another alternative form of the abutment module of the first embodiment, in which the abutment module includes a plurality of pin rollers.

Referring to FIG. 5, in combination with FIGS. 3 and 4, each abutment module 4 includes a base seat 41 and an abutment unit 42. The base seat 41 extends along a longitudinal direction (A) which is parallel to the longitudinal direction (I) when the abutment module 4 is mounted in the respective mounting hole 211 of the outer tube 21. The base seat 41 is fixed to the respective mounting hole 211 through a plurality of screws (not shown), but is not limited thereto. The base seat 41 has two notches 411 spaced apart from each other along the length thereof and facing the inner tube 22. The abutment unit 42 may include a plurality of rollers 421, a plurality of balls 422 (see FIG. 11), one or a plurality of slide plates 423 (see FIG. 12), or a plurality of pin rollers 424 (see FIG. 13). If the abutment unit 42 includes the rollers 421, the balls 422 or the pin rollers 424, they are rotatably disposed on the base seat 41. But, if the abutment unit 42 includes the slide plate(s) 423, it is fixed to the base seat 41. In this embodiment, the abutment unit 42 is exemplified as including two rollers 421 disposed respectively and rotatably in the notches 411 and facing the inner tube 22.

Figure 6:
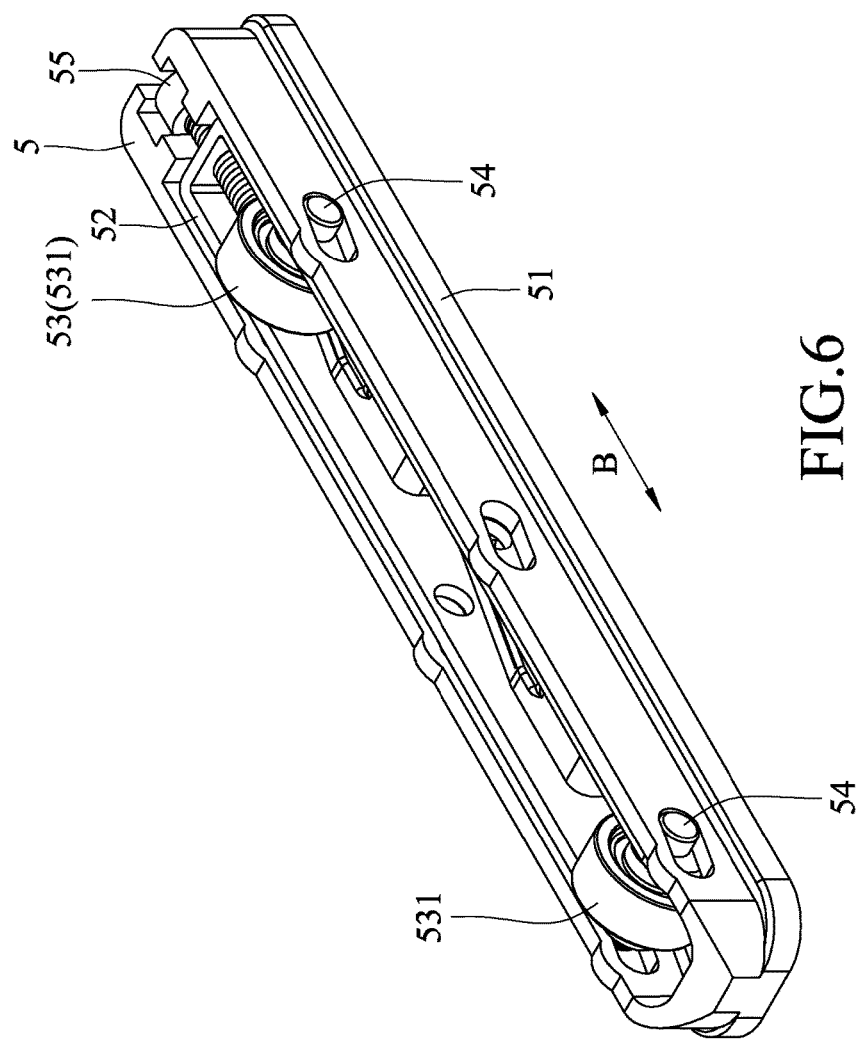
FIG. 6 is a perspective view of the adjustment module of the first embodiment.
Figure 7:
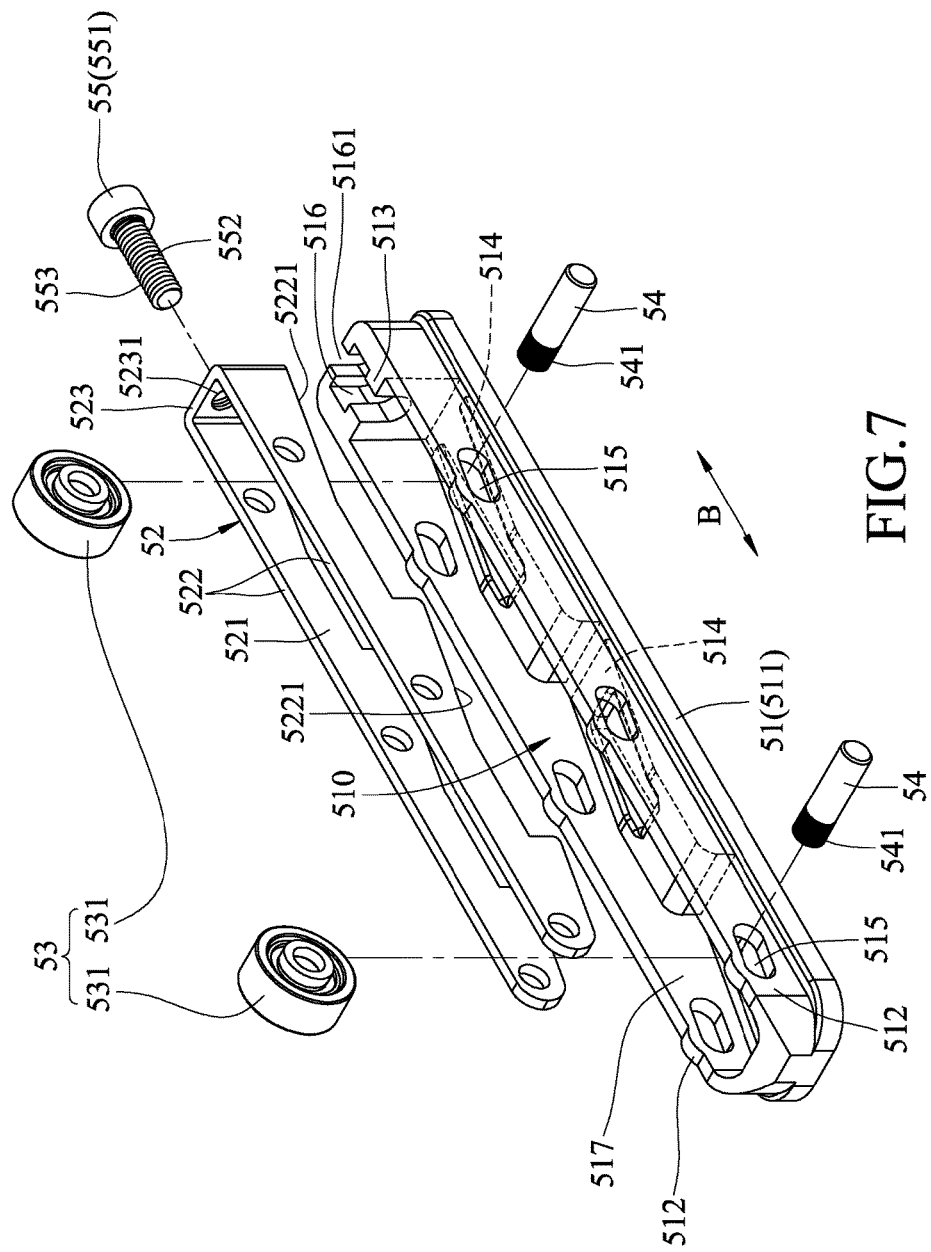
FIG. 7 is an exploded perspective view of the adjustment module of the first embodiment.
Figure 8:
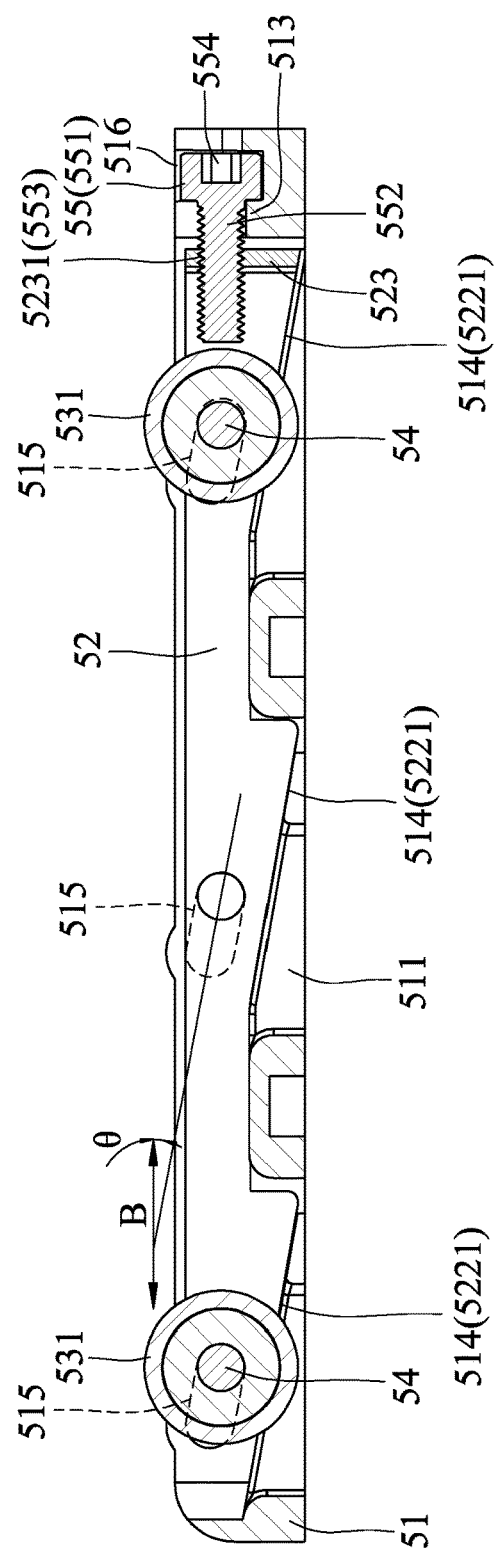
FIG. 8 is a sectional view of the adjustment module of the first embodiment in an assembled state.

Referring to FIGS. 6 to 8, in combination with FIGS. 3 and 4, the adjustment module 5 includes a base seat 51, an adjustment seat 52, a pressing unit 53, two shafts 54, and a drive member 55.

The base seat 51 is hollow, and extends along a longitudinal direction (B) which is parallel to the longitudinal direction (I) when the adjustment module 5 is mounted in the respective mounting hole 211 of the outer tube 21. The base seat 51 is fixed to the respective mounting hole 211 through a plurality of screws (not shown), but is not limited thereto. The base seat 51 includes a base wall 511, two side walls 512 and a stop piece 513. The base wall 511 has three inclined surfaces 514 spaced apart from each other along the longitudinal direction (B) and facing the inner tube 22 (see FIG. 10). The side walls 512 extend transversely from two opposite sides of the base wall 511 and cooperate with the same to define a receiving groove 510. Each side wall 512 has three inclined through slots 515 spaced apart from each other along the length thereof and respectively aligned with the inclined through slots 515 in the other side wall 512. An extending direction of each inclined surface 514 is parallel to an extending direction of each inclined through slot 515. The extending direction of each inclined through slot 515 forms an acute angle (θ) with the longitudinal direction (B). Since the extending direction of each inclined surface 514 is parallel to the extending direction of each inclined through slot 515, each inclined surface 514 also forms an acute angle (θ) with the longitudinal direction (B). The stop piece 513 is disposed in the receiving groove 510, and divides the same into a first receiving groove 516 and a second receiving groove 517 communicating with the first receiving groove 516 and longer than the first receiving groove 516. The first receiving groove 516 has an opening 5161 communicating with an external environment.

The adjustment seat 52 extends along the longitudinal direction (B), and is movably disposed in the second receiving groove 517. The adjustment seat 52 is made from a metal sheet which is bent and folded so as to form a U-shaped body including two spaced-apart legs 522, and a bight portion 523 between the legs 522. The legs 522 and the bight portion 523 cooperatively define a receiving space 521. Each leg 522 has three inclined surfaces 5221 abutting slidably and respectively against the inclined surfaces 514 of the base wall 511. The bight portion 523 has a threaded hole 5231.

The pressing unit 53 of this embodiment includes two rollers 531.

Each shaft 54 extends through a respective one of the rollers 531, and has two opposite ends respectively extending through the legs 522 and received slidably and respectively in one of the inclined through slots 515 in one of the side walls 512 and the aligned inclined through slot 515 in the other side wall 512. Through this, each roller 531 is rotatably supported by the respective shaft 54 on the adjustment seat 52 within the receiving space 521, and partially protrudes out of the adjustment seat 52 for abutment with an outer wall surface of the inner tube 22. One of the ends of each shaft 54 has a knurled surface 541 fixed to a respective one of the legs 522. The shafts 54 and the rollers 531 correspond with each other in number. Preferably, both are more than two.

The drive member 55 of this embodiment is in the form of a threaded bolt having a head 551 and a shank 552. The head 551 is rotatably disposed in the first receiving groove 516, and has a hexagonal socket 554 (see FIG. 4) facing the opening 5161. The shank 552 is integrally connected to the head 551, and has an external thread 553. The shank 552 extends through the stop piece 513, and is threadedly engaged with the threaded hole 5231 of the bight portion 523.

Figure 9:
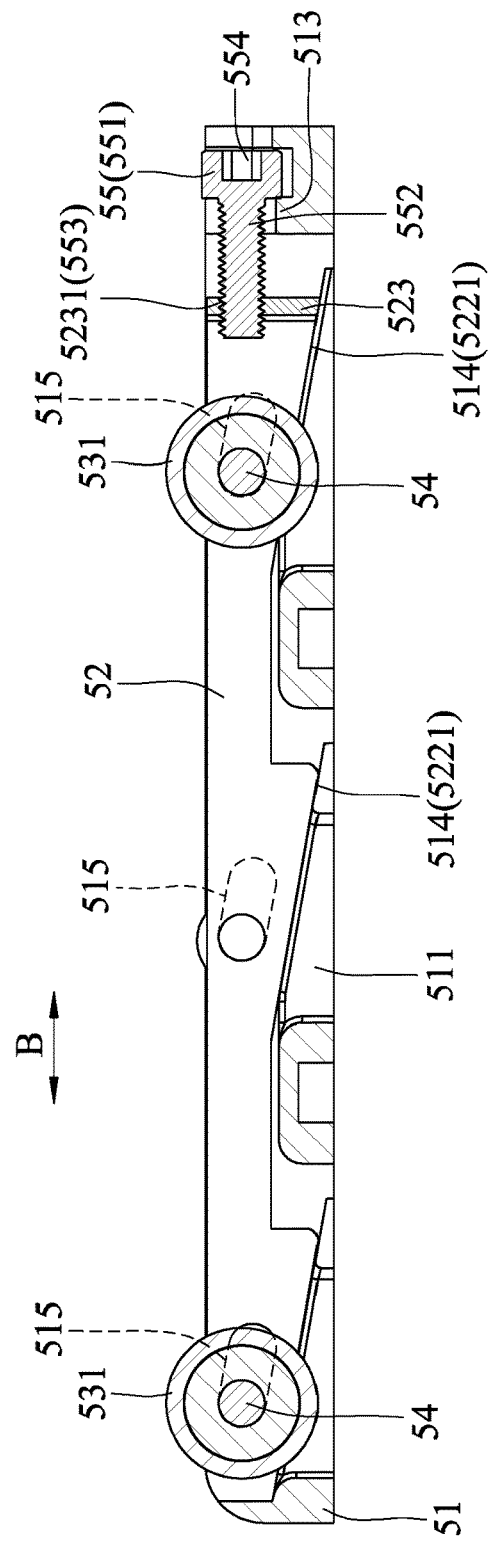
FIG. 9 is a view similar to FIG. 8, but with an adjustment seat being slidably moved along inclined surfaces of a base seat.

Referring to FIGS. 8 and 9, the drive member 55 is operable to drive movement of the adjustment seat 52. When an Allen wrench (not shown) is inserted into the hexagonal socket 554 in the head 551 of the drive member 55 through the opening 5161 (see FIG. 7), because the head 551 is restricted in the first receiving space 516 by the stop piece 513, the drive member 55 can only rotate about its own axis when driven by the wrench. Thus, when the drive member 55 is rotated by the wrench, the adjustment seat 52 is driven to move toward or away from the head 551 along the shank 552 through threaded engagement of the threaded hole 5231 in the bight portion 523 and the external thread 553 of the shank 552. Through this, the inclined surfaces 5221 of the legs 522 of the adjustment seat 52 are driven to slide along the respective inclined surfaces 514 of the base wall 511, and the rollers 531 are driven to follow the movement of the adjustment seat 52. Because the extending direction of each inclined surface 514 forms an acute angle (θ) with the longitudinal direction (B), when the adjustment seat 52 is driven by the drive member 55 to move along the inclined surfaces 514 of the base wall 511, the adjustment seat 52 is simultaneously moved toward a direction transverse to the longitudinal direction (B).

Figure 10:
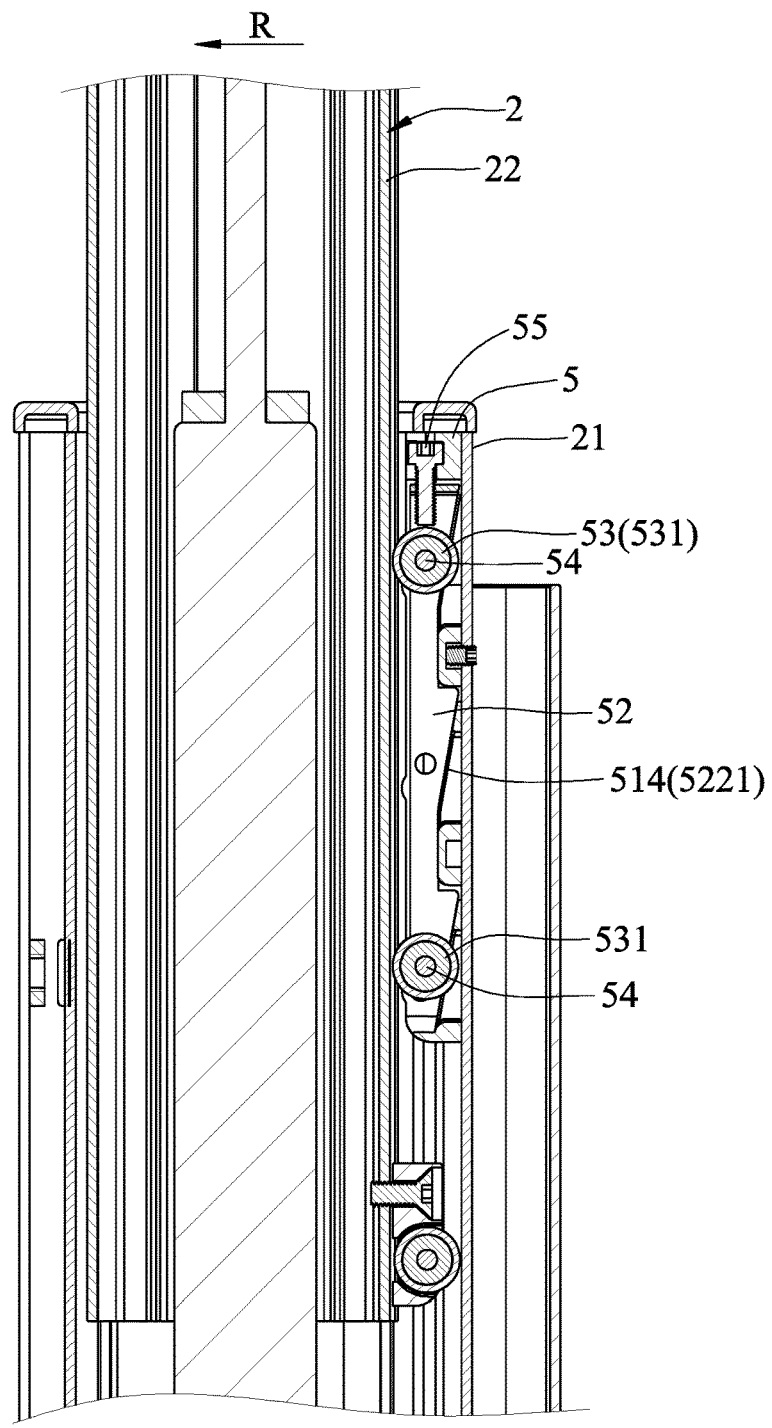
FIG. 10 is a fragmentary sectional view of the first embodiment, illustrating the adjustment module being sandwiched between the outer and inner tubes.

Referring to FIG. 10, in combination with FIGS. 3 and 4, after the abutment modules 4 and the adjustment module 5 of the adjustment mechanism 3 are respectively mounted and fixed in the mounting holes 211 of the outer tube 21 and surround the inner tube 22, the drive member 55 is operated to move the adjustment seat 52 along the shank 552 and urge the rollers 531 to move in a radial direction (R) of the inner tube 22, so that the rollers 531 can push the outer wall surface of the inner tube 22 to abut against the rollers 421 of the abutment units 42 of the abutment modules 42. Through this operation, the degree of abutment of the pressing unit 53 and the abutment units 42 against the outer wall surface of the inner tube 22 can be easily adjusted to correspond with the change in the gap between the inner and outer tubes 22, 21. When the inner tube 22 is moved relative to the outer tube 21 along the longitudinal direction (I), the inner tube 22 can be held by the adjustment mechanism 3 so as to maintain and stabilize its sliding movement relative to the outer tube 21.

It is worth to mention herein that the inclined surfaces 514, apart from guiding the movement of the adjustment seat 52, can also provide additional support to share the burden of the shafts 54. When the rollers 531 abut against the outer wall surface of the inner tube 22, the drive member 55 can be continuously rotated to continuously move and slide the inclined surfaces 5221 of the legs 522 of the adjustment seat on the respective inclined surfaces 514 so as to urge the rollers 531 against the outer wall surface of the inner tube 22 to produce a squeezing effect. Through this, the adjustment module 5 can provide the inner tube 22 with a great supporting force. The inclined surface 514 and the inclined surface 5221 correspond with each other in number which may be adjusted according to the requirement and is not limited to what is disclosed herein.

It should be noted herein that the adjustment mechanism 3 of the first embodiment includes two abutment modules 4 and one adjustment module 5. However, in other embodiment, the adjustment mechanism 3 may include one abutment module 4 and two adjustment modules 5, or three adjustment modules 5. When more than two adjustment modules 5 are used, one of the adjustment modules 5 is adjusted, while the other adjustment modules 5 are fixed and are viewed as abutment modules 4. After adjustment of the one of the adjustment modules 5 is completed, another one of the adjustment modules 5 may be adjusted, while the other adjustment modules 5 are viewed as abutment modules 4.

The advantages of this disclosure can be summarized as follows:

1. By operating the drive member 55, the pressing unit 53 can be driven to move toward the inner tube 22 so as to adjust the degree of abutment thereof against the outer wall surface of the inner tube 22 and correspond with the change in the gap between the inner and outer tubes 22, 21, thereby providing a stable supporting effect.

2. By adjusting the degree of abutment of the rollers 531 against the outer wall surface of the inner tube 22, the resistance during movement of the inner tube 22 relative to the outer tube 21 is also adjusted. Thus, the clamping force of the adjustment mechanism 3 can be easily adjusted by operating the drive member 55.

3. The inclined surfaces 514 of the base wall 511 can provide sufficient supporting force to the adjustment seat 52 and can share the force required by the shafts 54 to support the adjustment seat 52. Through this, the adjustment module 5 can provide a great supporting force to the inner tube 22.

Figure 14:
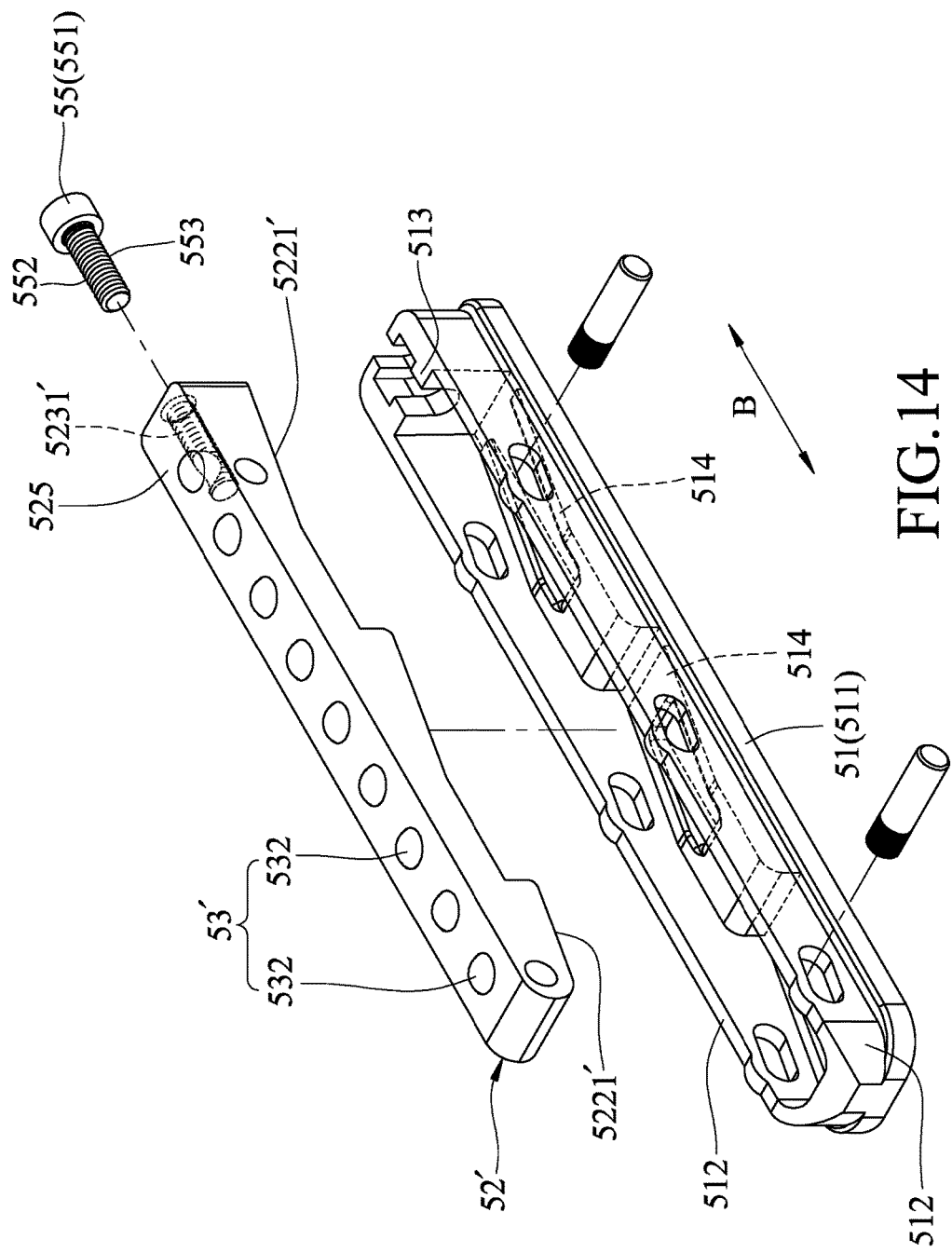
FIG. 14 is an exploded perspective view of an adjustment module of a lifting device according to the second embodiment of the present disclosure.
Figure 15:
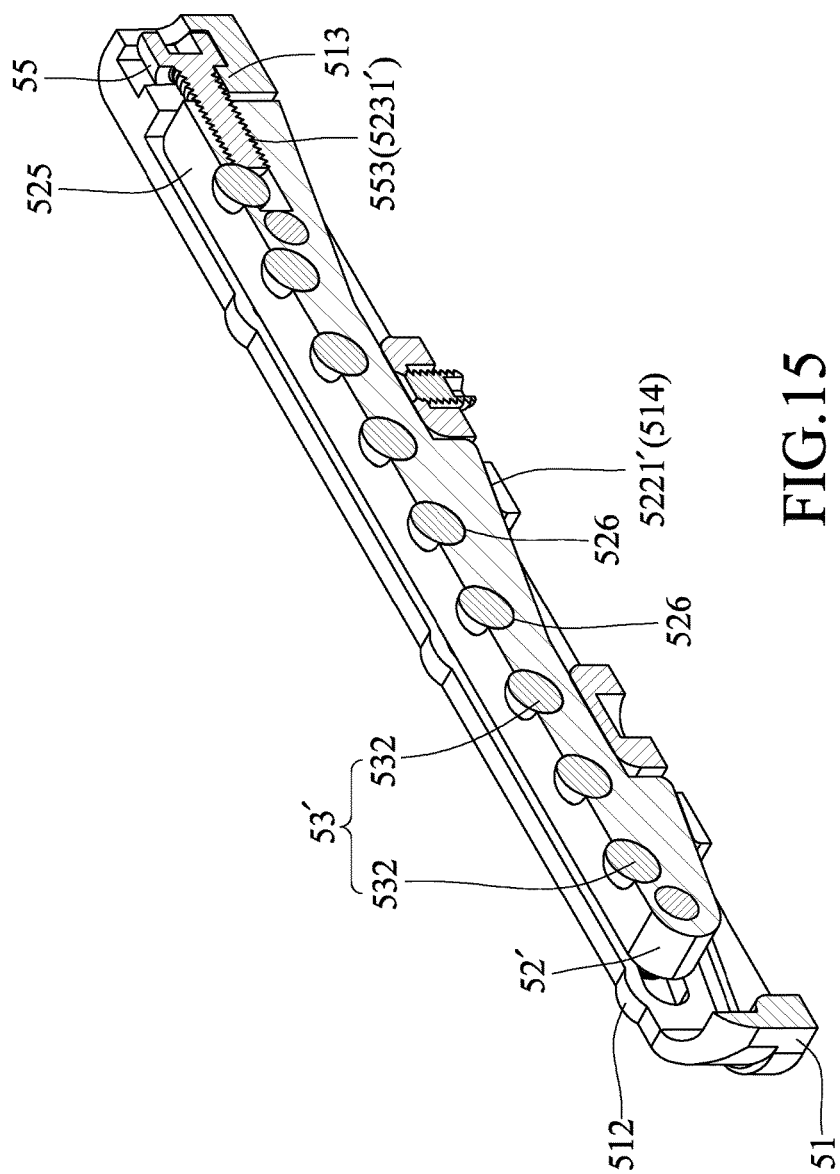
FIG. 15 is a sectional perspective view of the adjustment module of the second embodiment.

Referring to FIGS. 14 and 15, the second embodiment of the lifting device 2 of this disclosure is generally identical to the first embodiment, and differs in the structures of the adjustment seat 52 and the pressing unit 53. In this embodiment, the adjustment seat 52' has an inner surface 525, a plurality of ball sockets 526 formed in the inner surface 525 and spaced apart from each other along the length thereof, three inclined surfaces 5221' opposite to the inner surface 525, and a threaded hole 5231' that is formed in an end surface thereof between the inner surface 525 and the inclined surfaces 5221', that extends along the longitudinal direction (B), and that is threadedly engaged with the external thread 553 of the shank 552 of the drive member 55. The inclined surfaces 5221' abut respectively and slidably against the inclined surfaces 514 of the base wall 511. The pressing unit 53' includes a plurality of balls 532 received respectively and rotatably in the ball sockets 526 and partially protruding out of the inner surface 525.

When the drive member 55 is operated, the adjustment seat 52' is driven to move the pressing unit 53' therealong. The operation method is similar to that described in the first embodiment, so that a detailed description thereof is dispensed herewith. The second embodiment discloses an alternative form of the adjustment module 5. A user is given an alternative to select according to his requirement.

Figure 16:
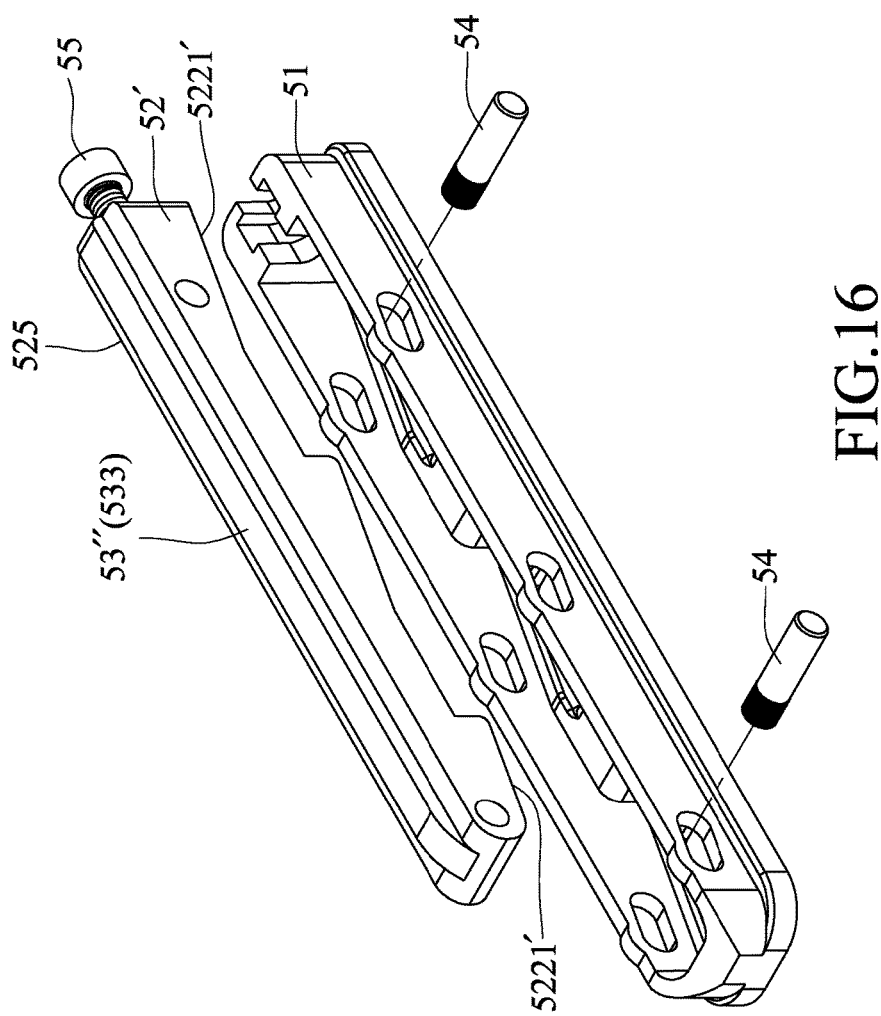
FIG. 16 is an exploded perspective view of an adjustment module of a lifting device according to the third embodiment of the present disclosure.

Referring to FIG. 16, the third embodiment of the lifting device 2 of this disclosure is generally identical to the second embodiment, and differs in the structure of the pressing unit 53. In this embodiment, the pressing unit 53" includes a slide plate 533 fixed on the inner surface 525 of the adjustment seat 52' and partially protruding therefrom to abut against the outer wall surface of the inner tube 22. The slide plate 533 is made of a wear-resistant plastic material selected from, but not limited to, polyoxymethylene (POM), nylon, and Teflon. The slide plate 533 is driven to move toward and abut against the outer wall surface of the inner tube 22. In comparison with the rollers 531 of the first embodiment and the balls 532 of the second embodiment, the slide plate 533 of the third embodiment is not rotatable, but has a larger contact area with the outer wall surface of the inner tube 22. Hence, the slide plate 533 can provide a more stable supporting area and better clamping and supporting effects. The third embodiment discloses an alternative form of the pressing unit 53". A user is given an alternative to select according to his requirement.

Figure 17:
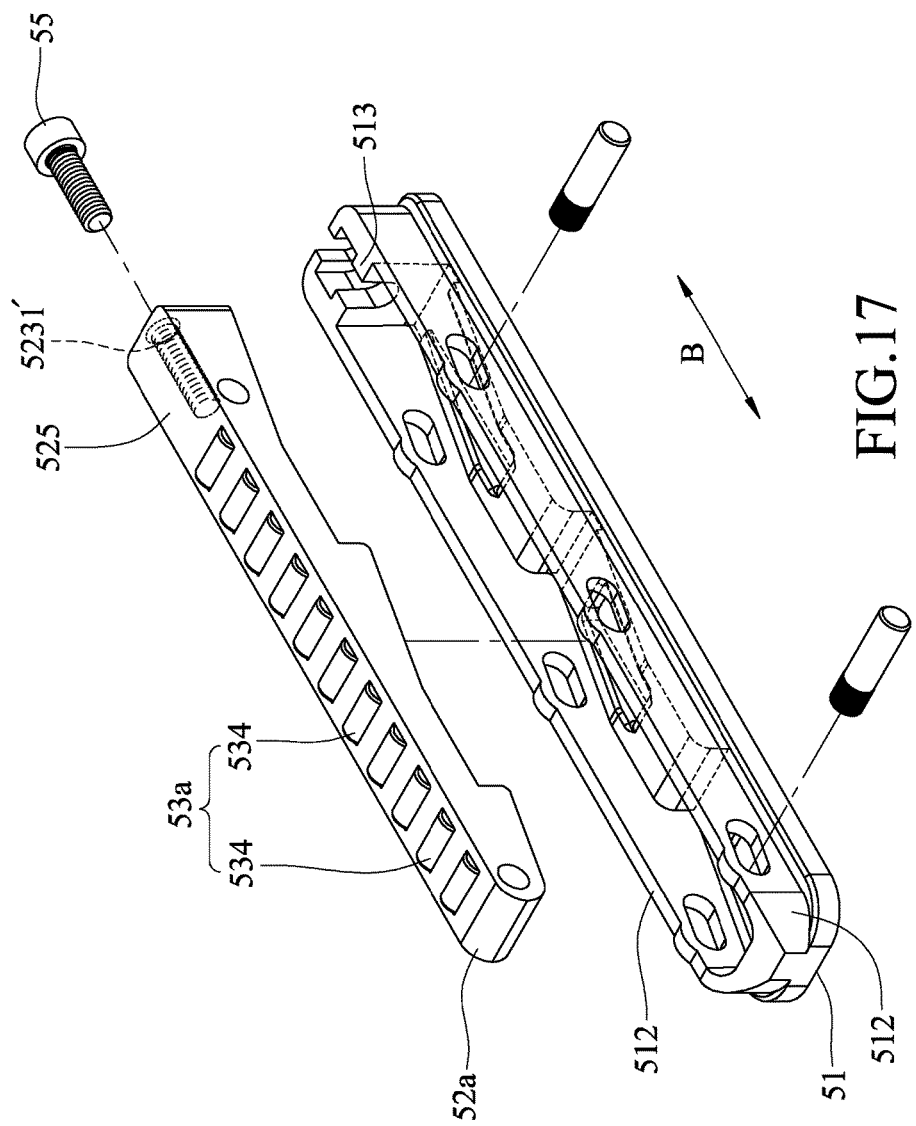
FIG. 17 is an exploded perspective view of an adjustment module of a lifting device according to the fourth embodiment of the present disclosure.
Figure 18:
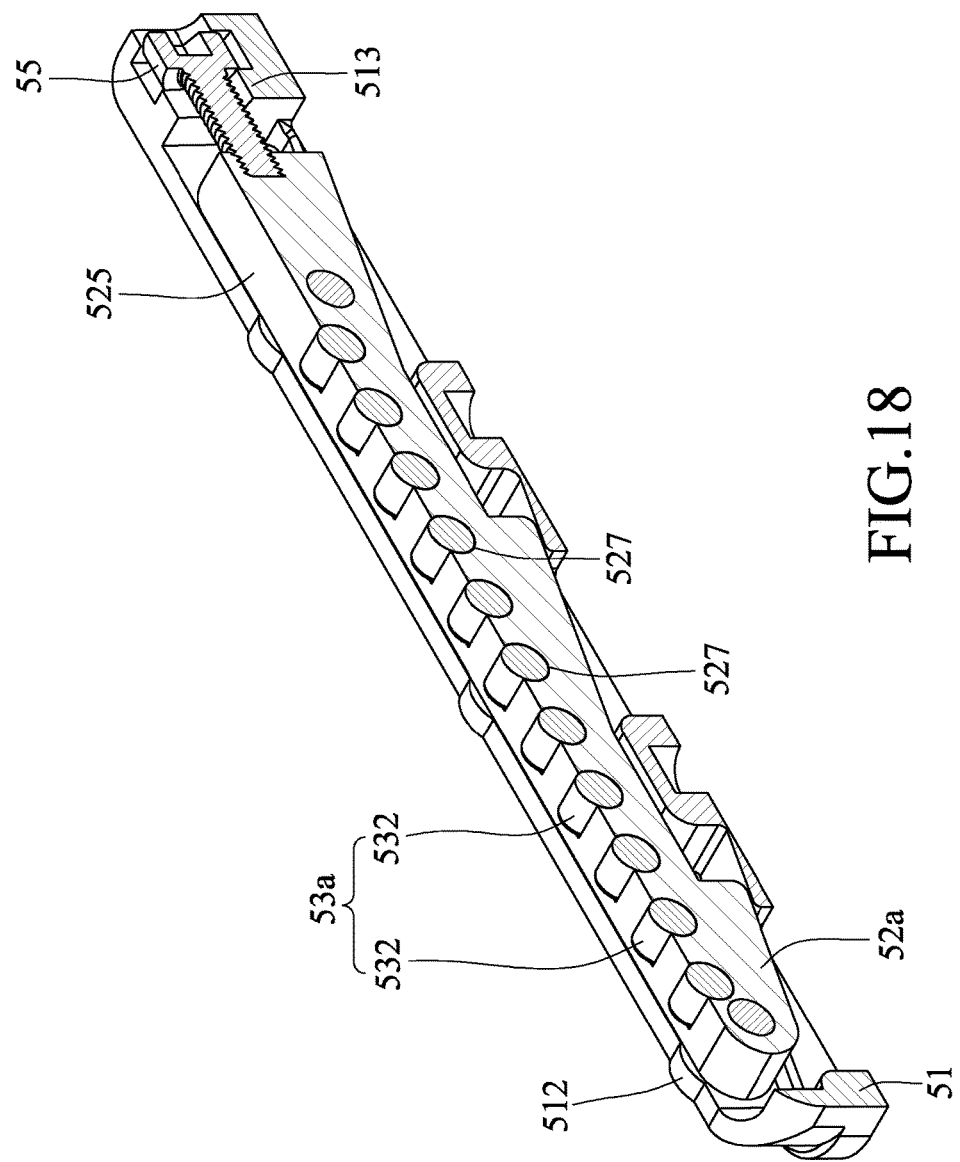
FIG. 18 is a sectional perspective view of the adjustment module of the fourth embodiment.

Referring to FIGS. 17 and 18, the fourth embodiment of the lifting device 2 of this disclosure is generally identical to the second embodiment, and differs in the structures of the adjustment seat 52 and the pressing unit 53. In this embodiment, the inner surface 525 of the adjustment seat (52a) is formed with a plurality of cylindrical grooves 527 spaced apart from each other along the length thereof. The pressing unit (53a) includes a plurality of pin rollers 534 disposed rotatably and respectively in the cylindrical grooves 527 and partially protruding from the inner surface 525. Because the pin rollers 534 have a large contact area with the outer wall surface of the inner tube 22 (see FIG. 4), the fourth embodiment has a better supporting effect than the second embodiment. A user is given an alternative to select according to his requirement.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An adjustment mechanism of a lifting device which includes an outer tube and an inner tube movably inserted into the outer tube, said adjustment mechanism being configured to be disposed between the inner and outer tubes and comprising:

two angularly space-apart abutment modules configured to be disposed on an inner wall surface of the outer tube, each of said abutment modules including an abutment unit configured to abut against an outer wall surface of the inner tube; and an adjustment module configured to be disposed on the inner wall surface of the outer tube angularly spaced apart from said abutment modules and including an adjustment seat, and a pressing unit and a drive member both disposed on said adjustment seat, said drive member being operable to drive movement of said adjustment seat relative to the outer tube so as to push said pressing unit against the outer wall surface of the inner tube to thereby abut the outer wall surface of the inner tube against said abutment units of said abutment modules.

2. The adjustment mechanism as claimed in claim 1, wherein said adjustment module further includes a base seat and a shaft, said base seat including two opposite side walls, said adjustment seat being disposed between said side walls, each of said side walls having an inclined through slot, said shaft extending through said adjustment seat and having two opposite ends received slidably and respectively in said inclined through slots of said side walls.

3. The adjustment mechanism as claimed in claim 1, wherein said adjustment module further includes a base seat, said base seat including a base wall configured to be fixed on the inner wall surface of the outer tube and having at least one inclined surface configured to face the inner tube, said adjustment seat having at least one inclined surface slidably abutting against said at least one inclined surface of said base wall.

4. The adjustment mechanism as claimed in claim 3, each of the inner and outer tubes extends along a longitudinal direction (I), wherein said adjustment seat extends along a longitudinal direction (B) parallel to the longitudinal direction (I), and further has a threaded hole extending along the longitudinal direction (B), said drive member having an external thread threadedly engaged with said threaded hole.

5. The adjustment mechanism as claimed in claim 1, wherein said pressing unit includes a plurality of rollers rotatably disposed on said adjustment seat and partially protruding out of said adjustment seat for abutment with the outer wall surface of the inner tube.

6. The adjustment mechanism as claimed in claim 5, wherein said adjustment module further includes a plurality of shafts each of which extends through a respective one of said rollers and each of which has a knurled surface at one end thereof fixed to said adjustment seat.

7. The adjustment mechanism as claimed in claim 1, wherein said pressing unit includes a plurality of balls rotatably disposed on said adjustment seat and partially protruding out of said adjustment seat for abutment with the outer wall surface of the inner tube.

8. The adjustment mechanism as claimed in claim 1, wherein said pressing unit includes a plurality of pin rollers rotatably disposed on said adjustment seat and partially protruding out of said adjustment seat for abutment with the outer wall surface of the inner tube.

9. The adjustment mechanism as claimed in claim 1, wherein said pressing unit includes a slide plate fixed on said adjustment seat and partially protruding out of said adjustment seat for abutment with the outer wall surface of the inner tube.

10. The adjustment mechanism as claimed in claim 1, wherein said abutment unit of each of said abutment modules includes a plurality of rollers.

11. The adjustment mechanism as claimed in claim 1, wherein said abutment unit of each of said abutment modules includes a plurality of balls.

12. The adjustment mechanism as claimed in claim 1, wherein said abutment unit of each of said abutment modules includes a slide plate.

13. The adjustment mechanism as claimed in claim 1, wherein said abutment unit of each of said abutment modules includes a plurality of pin rollers.

14. A lifting device comprising:

an outer tube;

an inner tube movably inserted into said outer tube; and an adjustment mechanism disposed between said inner and outer tubes and including two angularly space-apart abutment modules disposed on an inner wall surface of said outer tube, each of said abutment modules including an abutment unit abuttable against an outer wall surface of said inner tube, and an adjustment module disposed on said inner wall surface of said outer tube angularly spaced apart from said abutment modules and including an adjustment seat, and a pressing unit and a drive member both disposed on said adjustment seat, said drive member being operable to drive movement of said adjustment seat relative to said outer tube so as to push said pressing unit against said outer wall surface of said inner tube to thereby abut said outer wall surface of said inner tube against said abutment units of said abutment modules.

* * * * *